United States Patent Office 3,404,109
Patented Oct. 1, 1968

---

3,404,109
PRODUCTION OF POLYETHER DIOLS USING WATER AS A TELOGEN
Jack Milgrom, Akron, Ohio, assignor to The General Tire & Rubber Company, a corporation of Ohio
No Drawing. Continuation-in-part of application Ser. No. 258,530, Feb. 14, 1963. This application Oct. 15, 1965, Ser. No. 496,721
11 Claims. (Cl. 260—611)

ABSTRACT OF THE DISCLOSURE

Low molecular weight hydroxy-terminated polyoxyalkylene diols having a hydroxyl functionality of approximately 2 are prepared by polymerization in the presence of a small amount of water of epoxide and/or oxetane monomers using certain double metal cyanide complexes, e.g., zinc cobalticyanide acyclic polyether complex, as polymerization catalysts. The resulting telomers may vary from light oils to greases and solids are useful in making polyurethane foams and elastomers by reaction with polyisocyanates.

---

Cross reference to related application

Reference is made under the provisions of 35 USC 120 to copending application Ser. No. 258,530, filed Feb. 14, 1963, now U.S. Patent No. 3,278,457 of which the present application is a continuation in part.

It is an object of the present invention to provide a method for producing substantially hydroxy-terminated polyoxyalkylene diols.

It is another object of this invention to provide a process for producing relatively low molecular weight liquid polyoxyalkylene diols having a hydroxyl functionality of approximately 2.

These and other objects and advantages of the present invention will become more apparent to those skilled in the art from the following detailed description and examples.

According to the present invention it has been discovered that substantially hydroxy-terminated polyoxyalkylene diols can be produced by the polymerization of (1) epoxide and/or oxetane monomers with (2) water (3) in the presence of certain double metal cyanide complexes which have been treated with organic materials such as alcohols, ethers, esters and the like. Depending upon the amount of water employed, the resulting polymers (hereinafter referred to as telomers) can vary from light oils to greases and solids having a hydroxyl functionality of about 2.

The organic cyclic oxides which can be telomerized in accordance with the process of this invention include any cyclic oxides, such as the 1,2-epoxides, oxetanes, 3-substituted oxetanes or 3,3-disubstituted oxetanes, having an oxygen-carbon ring in which an oxygen atom is joined to 2 or 3 carbon atoms in the ring which will open and telomerize with the same or other cyclic oxide monomers in the presence of the double metal cyanide complex catalyst and which have up to a total of 18 carbon atoms. That is, to say, 3 carbon atoms in the ring and up to 15 carbon atoms in the side chains. These cyclic oxide monomers may also contain 1, 2 or more aliphatic double bonds. Preferably, the cyclic oxides contain only 1 aliphatic carbon-to-carbon double bond. The alkenyl, ether and halogen substituted derivatives (except easily ionized halogen) of these cyclic oxides also can be employed.

Examples of useful cyclic oxides which can be employed in the process of the present invention are ethylene oxide (1,2-epoxy ethane), 1,2-propylene oxide, 1,2-butene oxide, 1,2-hexene oxide, 1,2-dodecane monoxide, isobutylene oxide, styrene oxide, 1,2-pentene oxide, isopentene oxide, 1,2-heptene oxide, allyl glycidyl ether, isoheptene oxide, 1,2-octene oxide, methyl glycidyl ether, ethyl glycidyl ether, phenyl glycidyl ether, butadiene monoxide, isoprene monoxide, oxetane (1,3-propylene oxide), tolyl glycidyl ether, 3,3-dimethyl oxetene, 3-allyl-3-methyl oxetane, 3-vinyl-3-methyl oxetane, 1,2-pentadecene oxide, 3-butyl-3-decyl oxetane, 3-chloromethylene oxetane, 3-chloromethyl-3-methyl oxetane and the like.

It is preferred to employ the lower molecular weight oxides such as ethylene oxides, propylene oxides, butylene oxides and the like containing from 2 to 12 carbon atoms.

The double metal cyanide complex catalysts which are useful in the process of this invention are prepared by reacting a transition metal cyanide complex with a metal salt in aqueous media. Removal of substantially all of the water present in the catalyst is desirable to enhance the activity of the catalyst although it would appear that removal of all the water is not practicable and may not be desirable. It has been found that most of the water can be removed and the activity of the catalyst further enhanced by treating the catalyst with a complexing or co-ordinating material such as an alcohol, ether, ester, sulfide, ketone or aldehyde.

In general, the double metal cyanide catalysts employed in the present invention have the following rational formulas:

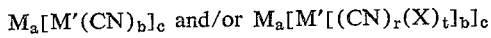

$$M_a[M'(CN)_b]_c \text{ and/or } M_a[M'[(CN)_r(X)_t]_b]_c$$

wherein M is a metal ion which forms a metal-oxygen bond that is relatively more stable than the co-ordinate bond between the metal and nitrogen atoms of the cyano, CN, group. On the other hand, M' is a transition metal ion that has more than 1 stable valence form and forms a relatively strong covalent bond with the carbon atom of the cyano group. An individual catalyst can contain more than 1 type of the M or M' metal ion in its structure. The grouping of these metals, with the cyanide ion sharing electrons with the 2 metal ions, usually exists in polymeric form as follows: $(-M'-CN\cdots M\cdots NC-M')_n$ wherein $n$ is an integer of at least 1, and super three-dimensional polymers can be formed depending upon the co-ordination numbers of M and M'. Moreover, those metal ions, which produce active cyanide catalysts can all co-ordinate with 6 groups (such as hexacyanoferrate (III)). Most of the hexacyanoferrates(III), including zinc hexacyanoferrate(III), have a cubic face-centered lattice.

The CN⁻ group in the catalyst molecule is the bridging group. However, other bridging groups can be present in the catalyst molecule so long as the catalyst molecule contains at least a majority of CN⁻ bridging groups. Thus, $r$ and $t$ are numbers and $r$ is greater than $t$. $t$ is 0 only when the CN group is the bridging group. For example, X in the formula above, which can be present with the CN⁻ group, can be $F^-$, $Cl^-$, $Br^-$, $I^-$, $OH^-$, NO, $O^{--}$, CO, $H_2O$, $NO_2^-$, $C_2O_4^{--}$, or other acid radicals, $SO_4^{--}$, $CNS^-$, $CNO^-$, $NCO^-$, $NCS^-$ and the like.

In the above formulas M is preferably a metal selected from the group consisting of Zn(II), Fe(II), Fe(III), Co(II), Ni(II), Mo(IV), Mo(VI), Al(III), V(IV), V(V), Sr(II), W(IV), W(VI), Mn(II), and Cr(III). On the other hand, M' is preferably a metal selected from the group consisting of Fe(II), Fe(III), Co(II), Co(III), Cr(II), Cr(III), Mn(II), Mn(III), V(IV), and V(V). Also $a$, $b$ and $c$ are integers whose values are functions of the valences and co-ordination numbers of M and M', and the total net positive charge on M multiplied by $a$ should be essentially equal to the total net negative charge on $M'[(CN)_b]$ or $[M'[(CN)_r(X)_t]_b]$ multiplied by $c$. In most instances $b$ corresponds to the co-ordination number of M' and is usually 6.

Examples of catalysts which fall within the above description and which may be employed in the process of the present invention are zinc hexacyanoferrate(III),
zinc hexacyanoferrate(II),
nickel(II)hexacyanoferrate(II),
nickel(II)hexacyanoferrate(III),
zinc hexacyanoferrate(III)hydrate,
cobalt(II)hexacyanoferrate(II),
nickel(II)hexacyanoferrate(III)hydrate,
ferrous hexacyanoferrate(III),
cobalt(II)hexacyanocobaltate(III),
zinc hexacyanocobaltate(II),
zinc hexacyanomanganate(II),
zinc hexacyanochromate(III),
zinc iodopentacyanoferrate(III),
cobalt(II)chloropentacyanoferrate(II),
cobalt(II)bromopentacyanoferrate(II),
iron(II)fluoropentacyanoferrate(III),
zinc chlorobromotetracyanoferrate(III),
iron(III)hexacyanoferrate(III),
aluminum dichlorotetracyanoferrate(III),
molybdenum(IV)bromopentacyanoferrate(III),
molybdenum(VI)chloropentacyanoferrate(II),
vanadium(IV)hexacyanochromate(II),
vanadium(V)hexacyanoferrate(III),
strontium(II)hexacyanomanganate(III),
tungsten(IV)hexacyanovanadate(IV),
aluminum chloropentacyanovanadate(V),
tungsten(VI)hexacyanoferrate(III),
manganese(II)hexacyanoferrate(II),
chromium(III)hexacyanoferrate(III), and the like.

Other cyanide complexes which can be employed are those such as

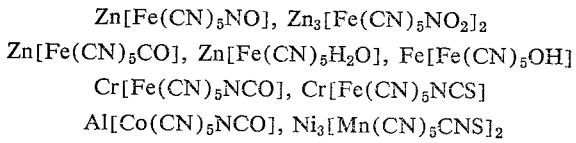

$$Zn[Fe(CN)_5NO], Zn_3[Fe(CN)_5NO_2]_2$$
$$Zn[Fe(CN)_5CO], Zn[Fe(CN)_5H_2O], Fe[Fe(CN)_5OH]$$
$$Cr[Fe(CN)_5NCO], Cr[Fe(CN)_5NCS]$$
$$Al[Co(CN)_5NCO], Ni_3[Mn(CN)_5CNS]_2$$

and the like. Mixtures of the above compounds can also be employed.

In general, the complex catalysts of this invention are prepared by reacting aqueous solutions of salts which give a precipitate of a metal salt of a transition metal complex anion. For example,

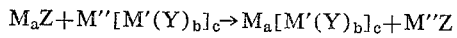

$$M_aZ + M''[M'(Y)_b]_c \rightarrow M_a[M'(Y)_b]_c + M''Z$$

wherein M is a metal ion which precipitates complex anion salts, for example, $Zn^{++}$. $a$, $b$ and $c$ in the above equation are integers but do not necessarily have the same values on both sides of the equation since their values are functions of the valences and co-ordination numbers of M, M′, M″ and possibly Y and Z. Z is a halide or other anion, for example, $Cl^-$. M″ is a hydrogen ion or a metal ion whose complex anion salts are soluble in water or other solvent, for example $K^+$, $Ca^{++}$ and the like. M′ is a complexing transition metal ion, for example, $Fe^{+++}$. Y is a complexing anion, for example, $CN^-$. In producing the complex cyanide catalyst useful in the present invention, an excess of $M_aZ$ is usually desired.

Apparently extraneous ions in the solution used to form the precipitate are easily occluded with the complex. Anions ($Cl^-$, etc.) co-ordinate to the positively charged metallic ions in the lattice, and cations ($K^+$) co-ordinate to the negatively charged nitrogen atoms of the cyanide bridging groups. These ions, especially those anions co-ordinating to or associated with the M atom, inhibit catalytic activity or prevent the complex from causing appreciable polymerization. Additionally, these ions, for example, easily ionizable Cl, may terminate the polymer chain.

To obtain a catalyst having the highest activity for the telomerization, an organic complexing agent is added to the catalyst precipitate preferably before it is centrifuged or filtered. This complexing agent can be mixed with the water during washing of the precipitate. It can be employed alone as the washing media provided the complexing agent is able to replace or dissolve the occluded ions, or it can be employed to treat or wash the precipitate after the precipitate has been washed with water, to replace at least a portion of the water. Sufficient complexing agent is employed to affect these results in order to enhance the activity of the catalyst. Such complexing agent should desirably co-ordinate with the M element or ion and should be a relatively low molecular weight organic complexing agent. The complexing agent should preferably be water miscible or soluble or substantially so, have a substantially straight chain and may contain up to 18 carbon atoms. Preferably, the complexing agent contains only up to 10 carbon atoms and is a liquid at room temperature.

Examples of complexing agents which can be employed in the double metal cyanide catalysts are alcohols, aldehydes, ketones, monoethers, diethers, polyethers and acyclic aliphatic polyethers. The alcohols are, for example, alkanols, such as methanol, ethanol, propanol, isopropanol, butanol, octanol, octadecanol and the like. The aldehydes are, for example, formaldehyde, acetaldehyde, butyraldehyde, valeric aldehyde, glyoxal, benzaldehyde, toluic aldehyde and the like. The ketones are, for example, alkanones, such as acetone, methyl ethyl ketone, 3-pentanone, 2-hexanone and the like. Examples of the cyclic ethers are dioxane, trioxymethylene and paraldehyde. Aliphatic saturated monoethers, diethers, polyethers and acyclic aliphatic polyethers are also useful as treating agents, such ethers are, for example, diethyl ether, 1-ethoxy pentane, bis-(beta-chloro ethyl) ether, butyl ether, ethyl propyl ether, bis-(beta-methoxy ethyl) ether, dialkyl ethers of alkylene glycols such as ethylene glycol dimethyl ether, triethylene glycol dimethyl ether, dimethoxy methane, acetal, methyl propyl ether, diethoxy methane, octaethylene glycol dimethyl ether, and the like. The acyclic polyethers are preferred. Still other complexing agents which can be employed are, for example, amides, esters, nitriles, and sulfides, of which the following are examples: formamide, acetamide, propionamide, butyramide, valeramide, amyl formate, ethyl formate, hexyl formate, propyl formate, ethyl acetate, methyl acetate, triethylene glycol diacetate and the like; acetonitrile, propionitrile and the like; dimethyl sulfide, diethyl sulfide, dibutyl sulfide, diamyl sulfide and the like. Ethers having more than 1 oxygen atom and which form a chelate with respect to the metal M are preferred. Mixtures of these organic complexing agents can also be employed. Where there is an excess of that required to complex with the metal catalyst, the excess can be removed by extraction with a hydrocarbon solvent, such as pentane, hexane, and the like.

After treatment with the organic complexing agent, the catalysts have the following rational formulas:

$$M_a[M'(CN)_b]_c \cdot (H_2O)_d \cdot (R)_e$$

and/or $$M_a[M'[(CN)_r(X)_t]_b]_c \cdot (H_2O)_d \cdot (R)_e$$

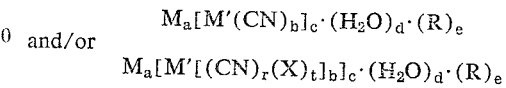

wherein $d$ is an integer or a fraction and $e$ is a number which may be an integer or a fraction, since the catalyst is a nonstoichiometric complex in which various amounts of water and the R groups may be bonded to the various metals. $e$ is 0 when the catalyst is not treated with the complexing agent. R is one or more of the complexing agents such as the organic amides, alcohols, aldehydes, esters, ethers and the like, as herein above set forth. M, M′, CN, X, $a$, $b$, $c$, $r$ and $t$ have the same meaning as herein above set forth. In general, $d$ and $e$ will have values corresponding in part to the co-ordination number of M. The sum of the oxygen and nitrogen co-ordinating atoms from water, the organic complexing agent is from about 0.1 up to about 5.0 gr.-atoms per g.-atom of the metal M. As the catalyst is subsequently heated and dried to remove all of the water and/or organic complexing agents, the resulting product exhibits a loss or a substantial decrease in its catalytic activity.

As shown in the above formulas if the organic complexing material is not used, R will not be present and thus $e$ will equal 0. Thus, the same formulas for these catalysts is $M_a(Z)_c \cdot (H_2O)_d \cdot (R)_e$ where M, $H_2O$, R, $c$, $d$ and $e$ have the above-identified meanings where $d$ and $e$ can also be or approach 0, wherein Z is selected from groups consisting of $M'(CN)_b$ and $M'[(CN)_r(X)_t]_b$ and where M', CN, X, $b$, $r$, and $t$ have the above-identified meanings. In the above formulas, the subscripts represent whole numbers as well as fractional numbers.

In the preparation of the catalyst it is to be noted that where the catalyst is filtered or centrifuged from the solution in which it was prepared and then washed with one of the polymerizable cyclic oxides, such as propylene oxide, it contains little or no catalytic activity. For the subsequent polymerization of such monomers in order to obtain a storage stable catalyst for the polymerization of the cyclic oxide, the catalyst should be filtered or centrifuged from the solution in which it was prepared and then washed with water and an ether or other organic complexing compound as hereinabove described and subsequently with 1 of the polymerization cyclic oxide monomers. This results in a very active catalyst species.

After the washing steps, the catalyst can be employed per se. However, it is preferred to dry the catalyst to remove excess treating agent and any remaining easily removable water and to provide for a more easily handled material. Such drying is accomplished by subjecting the catalyst to a vacuum or by heating the catalyst in air or in an inert atmosphere at a temperature up to about 100° C. It is preferred to dry the catalyst under a vacuum at low temperature (for example, 25° C. at 0.5 to 1 mm. Hg), or in a stream of air, nitrogen, or inert gas at from 5° to 25° C. A heat-treated catalyst shows lesser activity and thus must be employed in higher concentration than the vacuum treated catalyst. High temperatures are to be avoided since the catalytic activity of the catalyst is decreased as the temperature of drying is increased. It is believed that, at the high temperatures, some of the oxygenated or other organic complexing agents which are weakly co-ordinated to the metal M may be lost thereby leaving voids in the crystal lattice, and the atoms in the crystal lattice may rearrange to satisfy co-ordination requirements of the metals. Heating may also remove the cyanide ions, and reduce the metal M'. It is also possible that the molecular weight of the catalyst can increase thereby reducing the number of exposed metal ions on the surface of the catalyst and/or active sites. It is preferred to employ freshly prepared catalysts since the catalysts slowly decompose upon storage and thus reduce the catalytic activity. Where the catalyst is to be stored for long periods of time, it is preferred that they be stored at reduced temperatures to decrease the amount of decomposition.

While it is not precisely known what occurs to make the double metal cyanide complexes so useful in this polymerization, it is believed that the following takes place. While the following discussion relates to the treatment of the double metal cyanide catalyst with ethers, it will be appreciated that it is generally also applicable to the treatment with other organic complexing agents hereinabove set forth. It has been shown that, for example, with respect to zinc hexacyanoferrate, as an illustration, when the precipitate is washed with dioxane, a more effective catalyst is produced. During this treatment with dioxane it is believed that a number of reactions take place: (1) some of the chloride ions in the lattice are oxidized, resulting in the reduction of Fe(III) to Fe(II); (2) the chlorine from reaction (1) reacts with the water and ether present during the wash-treatment to give Cl⁻, and chlorinated ether; (3) the successive washes remove some of the products of reaction (2); and (4) the oxygen atoms of the ether apparently co-ordinate to the zinc ions in the lattice, rearranging the lattice structure by inserting dioxane groups between the zinc ions as follows:

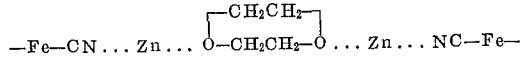

Thus, in the case of some of the dioxane-zinc hexacyanoferrate complexes, elemental analyses revealed that they were apparently nonstoichiometric complexes having the formula $Zn_3[Fe(CN)_6]_2(C_4H_8O_2)_x(H_2O)_y$, where $y=1$ to 2 and $x=2.5$ to 3.1. According to infrared and elemental analyses some of the dioxane in the complex may be chlorinated and some of the $H_2O$ may be in the form of —OH or —O— groups. As ordinarily prepared, these complexes generally contained from about 4% to 5% of Cl⁻ and a smaller amount of K⁺.

If the catalyst is prepared with $Zn(NO_3)_2$ instead of $ZnCl_2$, approximately 50% of the normal amount of dioxane is incorporated in the catalyst. This catalyst is not as effective as the one prepared from the chloride.

Although a great part of the iron in the ether (or other organic complexing moiety)—zinc hexacyanoferrate complex is believed to be Fe(II), as a result of the oxidation-reduction reaction that occurs during preparation, the dioxane complex prepared from $ZnCl_2$ and $K_4Fe(CN)_6$ is not as active even at polymerization temperatures of 80° C. Analyses showed that a reduced amount of dioxane was incorporated in such complexes and the chlorine content was high.

The reduced catalytic effect when using $Zn(NO_3)_2$ or $K_4Fe(CN)_6$ in the preparation of the catalyst complex is apparently related to the mechanism of the ether-hexacyanoferrate reaction. This mechanism may be viewed as follows. As the chloride ions of the surface zinc ions in the crystal lattice transfer electrons into the Zn . . . NC—Fe grouping, ether molecules can displace the resulting chlorine atoms and form ether-zinc coordinate bonds. For example,

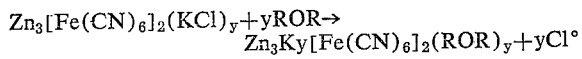

(Note: $y$ in the above equation is a number and may not be the same as in the preceding formulas.) The driving force for this reaction is the removal of $Cl_2$ by solution of the gas in the water and ether and the reaction of $Cl_2$ with ether.

This oxidation-reduction reaction and displacement of the chlorine by ether is accompanied by a change in the crystal lattice. According to elemental and infrared analyses, most of the zinc ions in the lattice appear to form coordination bonds with from 1 to 2 oxygen atoms. The oxygen atoms of both the water and the ether are involved in this coordination. X-ray analysis and density measurements appeared to confirm this lattice change. Thus, the oxygen atoms of the ether compete with the CN groups of the $Fe(CN)_6$ anion to produce a polymeric structure with more exposed zinc ions as shown below:

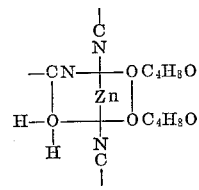

This process of opening up the lattice is aided by the presence of water during the ether treatment. Apparently, the water dissolves the $Fe(CN)_6$ anion sections in the lattice that are coordinated with K⁺ ions and more of the lattice thereby becomes exposed to the ether during the hexacyanoferrate-ether reaction.

Th experiments have indicated that chloride ions can inhibit the polymerization of the cyclic oxide employed in the double metal cyanide complex catalyst. Thus, it is desirable to reduce the amount of ionizable chlorine or other ionizable anions in the catalysts. For example, the catalyst can be washed with an ether-water solution whereby the soluble chloride salt can be removed. In another method the zinc hexacyanoferrate is prepared by reacting compounds such as calcium ferricyanide, aluminum ferricyanide or lithium ferricyanide with zinc chloride and the chloride salt which forms can be removed by the ether during the washing operation. It has also been found that when ions such as Cl⁻ are covalently bonded to the complexing catalyst, they apparently do not adversely affect the polymerization of the epoxides and oxetanes. In fact, chlorinated ethers have been found to improve the efficiency of the catalyst since it is believed that the halogenated ethers are more readily displaced by the epoxides and oxetanes to initiate polymerization.

It is preferred to employ the polyethylene glycol ethers to treat the double metal cyanide since a very active catalyst is thereby obtained. Apparently a chelate bond is formed with the zinc ion thereby increasing the driving force of the hexacyanoferrate-ether reaction, whereby a very open lattice is produced since polymeric coordination through the oxygen atom is prevented. The use of the dimethyl or diethyl ethers of diethylene glycol was found to increase the efficiency of the catalyst. It thus appears that the most active catalysts for the cyclic oxide polymerization are those which contain the greatest amount of zinc-oxygen-ether bonds rather than zinc-oxygen-water bonds and the least amount of ionizable chlorine.

The amount of catalyst employed can range from about 0.001 to 15% by weight of the total weight of the telomerizable cyclic oxide monomers employed during telomerization. It is preferred to employ from about 0.01 to 1.0% by weight of the catalyst based on the total weight of the monomers.

The amount of water employed as a telogen in the process of this invention is dependent upon the molecular weight of the polyoxyalkylene diol desired. The amount of water can vary from as low as .0001% by weight to as high as 5.0% by weight based on the polymerizable oxide. Where molecular weights below 5,000 are desired, the amount of water should be about .4% and higher. This water is added in the propylene oxide and does not include any water that may be occluded in the catalyst. The cyclic oxide may be telomerized in bulk or in a solvent. The cyclic oxide should be telomerized under inert or nonoxidizing conditions, for example, under a nitrogen, argon, neon, helium, krypton, or other inert gas. The cyclic oxide can also be telomerized under pressure of the vaporized cyclic oxide.

When large amounts of water are employed to yield low molecular weight telomers, it is preferred to add the water incrementally because large amounts of water decrease the rate of telomerization. Thus, in order to obtain practical rates of reaction, the water is added incrementally. The incremental addition of water can also be employed to give telomers of a broader molecular weight distribution than those possible where all of the water is added at the beginning of the reaction.

The telomerization is preferably conducted in a closed container at atmospheric pressure or at pressure slightly greater than atmospheric. The pressure should be sufficient to maintain a liquid state for dispersion of the catalyst and heat transfer, although it is also possible to bubble gaseous cyclic oxide monomers into the solution for the telomerization.

The temperature at which the process of this invention is conducted is not critical and can vary from about 0° C. to 125° C. or somewhat higher, preferably the temperatures from about 15° C. to 80° C. are employed. In some instances an induction period may be observed with the less active catalyst species.

The telomerized product in accordance with the process of this invention can generally be extended by employing the organic diisocyanates such as toluene diisocyanate, p-phenylene diisocyanate, ethylene diisocyanate, trimethylene diisocyanate, dodecamethylene diisocyanate, butylene - 1,2 - diisocyanate, m-phenylene diisocyanate, benzene - 1,2,4-triisocyanate, polymethylene polyphenyl isocyanate and the like to yield polyurethane foams and elastomers. The polyurethane elastomers are useful as gaskets, foot mats, shoe heels, engine mountings and the like. The polyurethane foams are useful as insulation and the like.

The following examples serve to further illustrate the invention and are not to be construed as limitations thereon. In the examples all parts are by weight unless otherwise specifically stated.

Example I

A zinc-hexacyanoferrate-dioxane complex catalyst (essentially $Zn_3(Fe(CN)_6)_2 \cdot 3.1C_4H_8O_2 \cdot 1.6H_2O$) was prepared as follows: An aqueous solution (200 ml.) of $K_3Fe(CN)_6$ [0.430 molar] was added slowly to 75 ml. of an aqueous solution of zinc chloride (1.89 molar). This is equivalent to a 10 mol percent excess of zinc chloride. The precipitated zinc hexacyanoferrate was separated by centrifugation (2,000 r.p.m. for 30 min.) and washed four times with 200-ml. portions of anhydrous, peroxide-free dioxane and dried at 25° C. at less than 1 mm. Hg overnight. It was employed to catalyze the polymerization of propylene oxide and allyl glycidyl ether in the presence and in the absence of water. 0.1 gram of the zinc hexacyanoferrate dioxane complex and 0.1 gram of phenyl-beta-naphthylamine and air was charged into a dry, crown-capped, beverage bottle, containing a magnetic stirring bar. The bottle was flushed with nitrogen, capped and propylene oxide (47.1 grams, 0.81 mole) and allyl glycidyl ether (2.88 grams, 0.25 mole) was added by means of a hypodermic syringe. In the first instance the propylene oxide contained no water and in the second, the propylene oxide contained .00023 weight percent water. The polymers obtained at the same conversion (93%) had intrinsic viscosities in isopropanol at 60° C. of 4.9 and 2.8 respectively. This shows the effect of water in reducing the molecular weight.

Example II

In this example a zinc-hexacyanocobaltate-acetone complex prepared as follows was employed as the catalyst. A solution containing 694 g. $Ca_3[Co(CN)_6]_2$ and 505 g. water was added dropwise to a solution of $ZnCl_2$ (55.5 g.) in 63.2 g. water. Acetone (1895 g.) was then added to the slurry of the precipitate in water and the mixture was stirred for 15 minutes. The precipitate was separated by centrifugation (7000 r.p.m., 40 min.) and then washed ten times with 70 volume percent acetone in water. Approximately 2000 ml. of solution was used for each wash. After two additional washes with 2000 ml. of pure acetone, the solid cake was dried at 25° C. at less than 20 mm. Hg for 9–10 hours.

Then general procedure for the telomerization reaction is as follows. The catalyst was charged into a dry beverage bottle, the bottle capped, evacuated and filled with nitrogen. A propylene oxide-water mixture (25 grams) was added by means of a hypodermic syringe. The bottle was then placed in a constant-temperature bath maintained at 80° C. and agitated in an end-over-end rotating assembly. The product was recovered by evaporating the propylene oxide. The pertinent data are summarized in Table I. The molecular weight was determined by vapor phase osmometry. The hydroxyl content was determined and the functionality was calculated by dividing the number of moles of the hydroxyl group by the number of moles of the telomer.

TABLE I

| Experiments | Water in PO, wt. percent | Catalyst, wt. percent | Time, hrs. | Percent yield | Mol. wt. | Functionality |
|---|---|---|---|---|---|---|
| A | 0.18 | 0.02 | 2.5 | 92 | 8,500 | 1.9 |
| B | 0.36 | 0.04 | 24 | 92 | 4,000 | 2.1 |
| C | 0.54 | 0.16 | 22 | 70 | 2,150 | 2.2 |
| D | 0.72 | 0.16 | 24 | 81 | 1,450 | 2.3 |

Example III

The catalyst employed in this example was prepared as follows:

A glyme-zinc hexacyanocobaltate complex (essentially $Zn_3[Co(CN)_6]_2 \cdot 1.7$ glyme $\cdot 1.2H_2O \cdot 1.2ZnCl_2$) was prepared as follows. An aqueous solution (100 ml.) of $K_3Co(CN)_6$ [0.296 M] was passed through a bed containing the acid form of Amberlyst 15. In this process $H^+$ was exchanged for $K^+$. The acid solution was then evaporated at room temperature to a volume of 80 ml. resulting in a 0.370 M solution of $H_3Co(CN)_6$, and the solution was then rapidly mixed with 10 ml. of an aqueous solution of $ZnCl_2$ [4.87 M]. This is equivalent to using a 10 mol percent excess of $ZnCl_2$. After the precipitation of $Zn_3[Co(CN)_6]_2$ was complete, 60 g. of glyme was added slowly to the aqueous slurry and stirred for 15 minutes. The precipitate was separated by centrifugation (7000 r.p.m., 40 min.) and then washed twice with glyme (total volume: 188 ml.). The precipitate was finally recovered and dried at 25° C. at less than 1 mm. Hg overnight. Glyme is the dimethylether of ethylene glycol.

The catalyst $Zn_3[Co(CN)_6]_2 \cdot$ glyme (.08 g.) was weighed out and placed in a 12 ounce Pyrex bottle. All bottles were washed and rinsed in deionized water and dried at 200° C. overnight. After charging the catalyst, the bottles were immediately capped and evacuated at less than 22 mm. Hg pressure for 15 minutes. Propylene oxide (60 ml., 50 g.) was then added and deionized water then added by means of a syringe. The sample bottles were immediately placed into the safety can and placed in an 80° C. tumble action bath. The pertinent data in this example is summarized in the following chart.

TABLE II

| | A | B | C | D |
|---|---|---|---|---|
| Catalyst, gm | .08 | .08 | .08 | .08 |
| Propylene oxide, gm | 50 | 50 | 50 | 50 |
| Water, ml: | | | | |
| 1st addition | 1.00 | .35 | .20 | .20 |
| 2nd addition | | .65 | .80 | .80 |
| Total | 1.00 | 1.00 | 1.00 | 1.00 |
| Time between 1st and 2nd addition of water (min.) | | 218 | 100 | 68 |
| Reaction times, hrs | 24 | 24 | 24 | 24 |
| Temperature, °C | 80 | 80 | 80 | 80 |
| Percent conversion | 6.3 | 22.6 | 52.5 | 40.8 |
| Hydroxyl number | | 261 | 58.1 | 76.9 |

From the above data, it is evident that the incremental addition of water greatly improves the yield of the telomer.

What is claimed is:

1. A process for the preparation of polyoxyalkylene ether diols wherein the hydroxyl groups are substantially terminal hydroxyl groups which comprises admixing at least one polymerizable 1,2-epoxide, oxetane, 3-substituted oxetane or 3,3-disubstituted oxetane monomer selected from the group hereinafter defined with water in an amount from about 0.0001 to 5.0% by weight based upon said monomer in the presence of a catalyst in an amount of from about 0.001 to 15% by weight of said monomer, said catalyst comprising a double metal cyanide complex compound which in its generic form has the general formula $M_a(Z)_c$, wherein Z is selected from the group consisting of $M'(CN)_b$ and $M'[(CN)_r(X)_t]_b$, wherein M is at least one metal selected from the group consisting of Zn(II), Fe(II), Fe(III), Co(II), Ni(II), Mo(IV), Mo(VI), Al(III), V(IV), V(V), Sr(II), W(IV), W(VI), Mn(II) and Cr(III), M' is a metal selected from the group consisting of Fe(II), Fe(III), Co(II), Co(III), Cr(II), Cr(III), Mn(II), Mn(III), V(IV) and V(V), X is a member selected from the group consisting of $F^-$, $Cl^-$, $Br^-$, $I^-$, $OH^-$, $NO^-$, $O^{--}$, $CO$, $H_2O$, $NO_2^-$, $C_2O_4^{--}$, $SO_4^{--}$, $CNO^-$, $CNS^-$, $NCO^-$ and $NCS^-$, $a$, $b$ and $c$ being numbers whose values are functions of the valences and the coordination numbers of M and M', the total net positive charge on M times $a$ being essentially equal to the total net negative charge on Z times $c$, $r$ being a number greater than the number $t$, and maintaining said admixture at a temperature of from about 0 to 180° C. under an inert atmosphere wherein said water and said monomer react to produce polyoxyalkylene ether diols, said monomer being selected from the group consisting of ethylene oxide; 1,2-propylene oxide; 1,2-butene oxide; 1,2-hexene oxide; 1,2-dodecane monoxide; isobutylene oxide; styrene oxide; 1,2-pentene oxide; isopentene oxide; 1,2-heptane oxide; allyl glycidyl ether; isoheptene oxide; 1,2-octene oxide; methyl glycidyl ether; ethyl glycidyl ether; phenyl glycidyl ether; butadiene monoxide; isoprene monoxide; oxetane; tolyl glycidyl ether; 3,3-dimethyl oxetane; 3-allyl-3-methyl oxetane; 3-vinyl-3-methyl oxetane; 1,2-pentadecene oxide; 3-butyl-3-decyl oxetane; 3-chloromethylene oxetane and 3-chloromethyl-3-methyl oxetane.

2. A process as claimed in claim 1 wherein said catalyst contains water as a component.

3. A process as claimed in claim 1 wherein said catalyst contains an alkanol of having 1 to 18 carbon atoms as a component.

4. A process as claimed in claim 1 wherein said catalyst contains as a component an aldehyde selected from the group consisting of formaldehyde, acetaldehyde, butyraldehyde, valeric aldehyde, glyoxal, benzaldehyde and toluic aldehyde.

5. A process as claimed in claim 1 wherein said catalyst contains as a component an alkanone having 2 to 6 carbon atoms.

6. A process as claimed in claim 1 wherein said catalyst contains as a component a cyclic ether selected from the group consisting of dioxane, trioxymethylene and paraldehyde.

7. A process as claimed in claim 1 wherein said catalyst contains as a component a dialkyl ether of an alkylene glycol.

8. A process as claimed in claim 7 wherein said dialkyl ether is selected from the group consisting of ethylene glycol dimethyl ether and triethylene glycol dimethyl ether.

9. A process as claimed in claim 1 wherein said temperature is between 15 to 80° C.

10. A process as claimed in claim 1 wherein said catalyst is a zinc cobalticyanide complex.

11. A process as claimed in claim 1 wherein said catalyst is employed in an amount between 0.01 to 1% by weight and said water in an amount between 0.001 to 1% by weight.

References Cited

UNITED STATES PATENTS

| 2,942,033 | 6/1960 | Leis et al. | 260—615 |
| 3,075,928 | 1/1963 | Lanham. | |
| 3,278,457 | 10/1966 | Milgrom. | |
| 3,278,458 | 10/1966 | Belner. | |
| 3,278,459 | 10/1966 | Herold. | |

OTHER REFERENCES

Gaylord: Polyesters, Interscience Publishers, New York, 1963, pp. 175–176, 222–224.

LEON ZITVER, *Primary Examiner.*

H. T. MARS, *Assistant Examiner.*